J. M. HIGGINS.
ACETYLENE LAMP.
APPLICATION FILED FEB. 3, 1911.
1,039,535.
Patented Sept. 24, 1912.
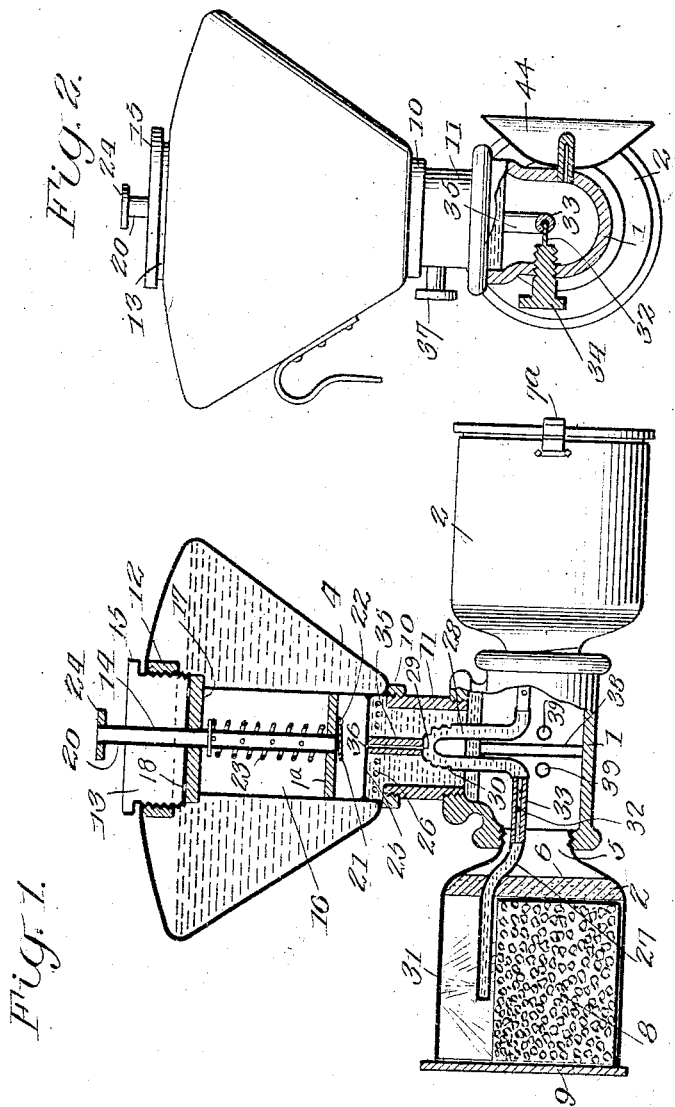
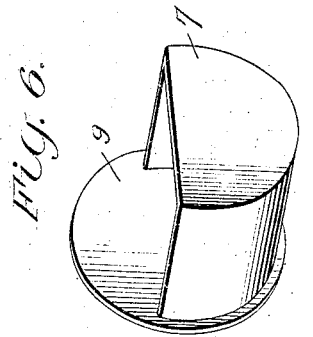
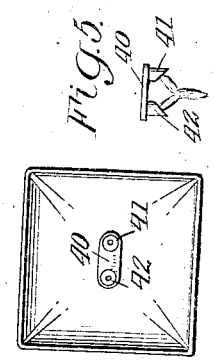
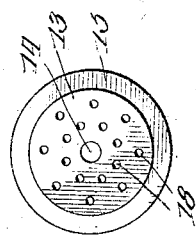
WITNESSES:
Samuel E. Wade
C. E. Framer
INVENTOR
John M. Higgins
BY Munn & Co
ATTORNEYS

UNITED STATES PATENT OFFICE.

JOHN MILTON HIGGINS, OF CASEYVILLE, ILLINOIS.

ACETYLENE-LAMP.

1,039,535.  Specification of Letters Patent.  Patented Sept. 24, 1912.

Application filed February 3, 1911. Serial No. 606,292.

*To all whom it may concern:*

Be it known that I, JOHN M. HIGGINS, a citizen of the United States, and a resident of Caseyville, county of St. Clair, and State of Illinois, have invented certain new and useful Improvements in Acetylene-Lamps, of which the following is a specification.

My invention is an improvement in acetylene lamps, and consists in certain novel constructions and combinations of parts, hereinafter described and claimed.

The object of the invention is to provide a strong, substantial, and simply constructed lamp of the character specified, which may be easily taken apart to permit of cleaning or repairing, which will be capable of a very nice adjustment, and which will permit of an economical use of carbid, while affording a high degree of illuminating power.

A further object is to provide a simple, compact lamp of the character specified, especially adapted for miners' use, wherein means is provided for permitting the carbid to be renewed without extinguishing the burner, and wherein the quantity of light emitted by the burner may be varied.

A further object is to provide an improved filling plug for the reservoir.

Referring to the drawings forming a part hereof, Figure 1 is a front view of the lamp partly in section, Fig. 2 is an end view. Fig. 3 is a top plan view of the filling cap. Fig. 4 is a front view of the burner holder. Fig. 5 is a similar view of the burner, and, Fig. 6 is a perspective view of one of the carbid holders.

The present embodiment of the invention consists of casing in the form of a T 1, having a carbid holder or receptacle 2 connected with each end of the T, and a water holder or reservoir 4 connected with the lateral branch of the T, while the burner 3 is arranged at one side of the T between the carbid holders. Both the ends and the lateral branch are internally threaded, and each of the casings of the carbid holder is provided with a reduced neck 5, which is threaded into the end of the T. The holders 2 are substantially cylindrical in form, and the outer end of each holder is open.

The body of the holder 2 is separated from the neck 5 by means of a disk 6 of felt or the like, and the carbid 8 is held in a species of drawer 7 substantially semi-cylindrical and having a disk 9 connected with its outer end.

The receptacle 7 fits within the casing or holder 2, and the inner face of the edge of the disk abuts against the end of the casing. A catch 7ª is provided for holding it in place in the casing. The reservoir 4 is approximately annular in form, having a central passage 16, the inner surface being cylindrical, while the outer surface is tapering, flaring outwardly toward the outer end of the reservoir. The lower or small end of the reservoir is provided with an internally threaded ring 10, which engages the outer end of a union 11, having its inner end threaded into the lateral branch of the T. The passage 16 does not extend to the top of the reservoir, and a plate or disk 17 is seated against the end of the tubular portion forming the passage 16. A filling plug 13 having a central opening 14 abuts at its inner end against the plate or disk 17, and the said inner end of the plug is provided with a plurality of perforations 18. The plug is threaded into a ring 12 connected with the reservoir coaxial with the passage 16, and the plug has a marginal flange 15 at its outer end fitting against the outer face of the casing when the plug is in place.

A diaphragm 1ª is arranged in the passage 16 near its inner end, and the diaphragm and the plate 17 have each a central opening, registering with the opening 14 of the plug 13. A tube 20 passes through the openings. A flap valve 21 is hinged at 22 to the under face of the diaphragm and normally closes the opening of the diaphragm. A spring 23 encircles the tube, and normally presses the tube outwardly. The plug 13 is open at its outer end as shown, and the reservoir is filled by loosening the plug one or two turns, and pouring the water into the open top of the plug. The water passes through the openings 18, and into the reservoir.

The tube 20 is the air vent, and when filling the reservoir, the tube is pushed inwardly, by pressing on the button 24 at its outer end, to open the valve 21, to permit the air to vent. As the water leaves the reservoir, the valve permits the entrance of air to prevent a vacuum. The passage 16 is closed near its inner end, by a partition 25, and the wall of the casing is provided with an annular series of perforations 26 below the partition, to permit the water to flow from the body of the reservoir, to that portion of the passage below the partition, and into the union 11.

It will be understood that the carbid holders are precisely alike, and either may be used. A feeding device is provided for leading the water from the reservoir to the holders. The said device comprises a tube 27 having intermediate its ends, and in the T, a substantially U-shaped portion 28, which extends upwardly into the union. The ends of the tube extend into the carbid holders, each passing through an opening in the disk 6, and extending above the receptacle 7. Each end of the tube is provided with an opening 31 in its upper side, and the water passing out at the opening, is sprayed against the inner face of the casing 2, as indicated in Fig. 1, and then falls upon the carbid.

The portion 28 of the tube 27 is provided with an opening 29 at its apex, and with a plurality of openings 30 below the apex. The latter openings admit water from the reservoir to the tube, while the former registers with the bore of a tube 35, arranged between the partition 25 and the portion 28.

The partition is provided with an opening 36 in register with the bore of the tube at its upper end, and the tube and openings permit the air to vent from the holders 2 into the space above the partition, from whence it may pass by way of the tube 20 to the atmosphere, when the valve 21 is opened.

The tube 27 is provided with a reduced portion 33 on each side of the partition 28, and a valve 32 is arranged in the bore of each of the reduced portions, and may be operated by a stem 34, threaded through the side wall of the T. The tube 35 is provided with a similar valve 37, so that the air passage may be closed when desired.

A double walled partition 38 is arranged transversely of the T between the members of the U-shaped portion of the tube, and an opening 39 leads forwardly from the T on each side of the partition. The double burner 40 shown in Fig. 5 may be used with the improved lamp. The said burner comprises a plate which is connected with the T in any suitable manner, and the plate is provided with a tube 41 for each of the openings 39. Each tube is beveled inwardly at 42, and the bore of each tube is angular, so that the flame of each burner is deflected inwardly, and the two flames meet, as shown in Fig. 5.

In operation, the holders 7 are filled with carbid, and the reservoir 4 is supplied with water. The holders are withdrawn to be filled, and during the filling of the reservoir, the valves 32 are closed. The filling plug is turned approximately two turns, and the water is poured into the plug, and passes into the reservoir through the openings 18.

The tube 20 is depressed to permit the air to vent, through the valve 21, which is opened by the depression of the tube. When filled, the plug is reseated, and the valves 32 are opened. The water passes as described, and is sprayed onto the carbid. The gas evolved filters through the felt disk into the T, and passes directly to the burner. It will be understood that either or both of the valves 32 may be opened. When one is closed, the carbid in the holder corresponding to the valve is not acted upon by the water. When both valves are open, the carbid in both holders is acted upon by the water.

When the carbid is exhausted in one of the holders, the valve 32, corresponding to that holder, is closed, and the receptacle 7 of the holder may be removed to clean and refill. Meanwhile, the other holder is supplying gas to the burner. The operation of the lamp is thus continuous and this is a feature of extreme importance in the class of lamps to which the present lamp belongs.

The lamp is especially adapted for miners' use, and a hook 43 is provided, on the reservoir to permit the lamp to be hooked to the body of the wearer. A reflector 44 is also provided within which the burner is placed. The operation of filling the holder with carbid is thus easily accomplished, and with absolutely no danger by the lamp's own light. All of the carbid is thus utilized. The provision of the double burner permits either or both flames to be used, so that each lamp is equal practically to two ordinary lamps. When but an ordinary illumination is desired, one burner may be cut off, and when a greater illumination is needed, the other burner is opened.

The arrangement of the feed tube above the carbid and the pressure of the water prevents the entrance of any gas into the feed tube, and also imparts a head or pressure to the gas, so that the burner is to some extent a force feed burner.

The device is as a whole, light, compact, simple in construction, and operation, easy to clean and to keep clean, and is economical both as to first cost, upkeep and operation.

I claim:

1. A lamp of the character specified, comprising a T, a substantially cylindrical casing for each end of the T, each casing having a reduced end threaded into the end of the T, a substantially semi-cylindrical carbid holder slidable in the casing and having a cover for the end thereof, means for holding the cover in place, a disk of porous material at the inner end of the casing, a feed tube having a substantially U-shaped portion at its center arranged in the T, the said portion extending upwardly into the lateral branch of the T, and the ends of the tube extending through the porous disk at each end of the tube and above the carbid in the holder, each end of the tube being closed, and having a spraying opening in its upper side, a valve for controlling each tube, a partition extending transversely of the T between the arms of the U-shaped portion of the tube, the T having an opening for the gas on each side of the opening, a burner having a connection for each opening, means connected with the lateral branch of the T for supplying water to the U-shaped portion of the tube, and means for permitting the air to vent from the tube.

2. A lamp of the character specified, comprising a T, a substantially cylindrical casing for each end of the T, each casing having a reduced end threaded into the end of the T, a substantially semi-cylindrical carbid holder slidable in the casing and having a cover for the end thereof, means for holding the cover in place, a disk of porous material at the inner end of the casing, a feed tube having a substantially U-shaped portion at its center arranged in the T, the said portion extending upwardly into the lateral branch of the T, and the ends of the tube extend through the porous disk at each end of the tube and above the carbid in the holder, each end of the tube having its end closed, and having a spraying opening in its upper side, a valve for controlling each tube, a partition extending transversely of the T between the arms of the U-shaped portion of the tube, the T having an opening for the gas on each side of the opening, a burner having a connection for each opening, and means connected with the lateral branch of the T for supplying water to the U-shaped portion of the tube.

3. A lamp of the character specified, comprising a T, a casing detachably connected with each end of the T, a carbid holder slidable in each casing, a reservoir for water connected with the lateral branch of the T, said reservoir having a central passage registering with the lateral branch, a substantially U-shaped tube in the T, and extending upwardly into the reservoir, and having openings for admitting water to the tube, the reservoir having an air chamber in the passage, a tube leading from the first named tube to the chamber, the ends of the feed tube extending above the carbid holders and each having an opening in its upper side, a valve between each of the ends and the U-shaped portion, a partition in the T between the arms of the U-shaped portion of the tube, the T having an opening on each side of the portion, a burner having a connection for each opening, a vent tube for the air chamber, and a valve for controlling the tube.

4. A lamp of the character specified, comprising a T, a casing detachably connected with each end of the T, a carbid holder slidable in each casing, a reservoir for water connected with the lateral branch of the T, said reservoir having a central passage registering with the lateral branch, a substantially U-shaped tube in the T and extending upwardly into the reservoir, and having openings for admitting water to the tube, the reservoir having an air chamber in the passage, a tube leading from the first named tube to the chamber, the ends of the feed tube extending above the carbid holder, and each having an opening in its upper side, a valve between each of the ends and the U-shaped portion, a partition in the T between the arms of the U-shaped portion of the tube, the T having an opening on each side of the partition, a burner having a connection for each opening, and means for venting the air from the air chamber.

5. A lamp of the character specified, comprising a T, a casing detachably connected with each end of the T, a carbid holder slidable in each casing, a reservoir for water connected with the lateral branch of the T, said reservoir having a central passage registering with the lateral branch, a substantially U-shaped tube in the T, and extending upwardly into the reservoir, and having openings for admitting water to the tube, the reservoir having an air chamber in the passage, a tube leading from the first named tube to the chamber, the ends of the feed tube extending above the carbid holders, and each having an opening in its upper side, a valve between each of the ends and the U-shaped portion, a partition in the T between the arms of the U-shaped portion of the tube, the T having an opening on each side of the partition, and a burner having a connection for each opening.

6. A lamp of the character specified, comprising a T, a casing detachably connected with each end of the T, a carbid holder slidable in each casing, a reservoir for water connected with the lateral branch of the T, said reservoir having a central passage registering with the lateral branch, a substantially U-shaped tube in the T, and extending upwardly into the reservoir and having openings for admitting water to the tube, the end of the feed tube extending above the carbid holders, each end having a spraying opening in its upper side, a valve between each end and the U-shaped portion, a transverse partition at the center of the T, the T having a discharge opening at each side of the partition, and a burner having a connection for each opening.

7. A lamp of the character specified, comprising a T, a reservoir for water detachably connected with the lateral branch of the T, a receptacle for carbid detachably connected with each end of the T, a holder for carbid in each receptacle, a feeding tube leading from the reservoir to each receptacle and extending above the holder, a valve for controlling each tube, a partition at the center of the T, the T having a discharge opening on each side of the partition, and a burner having a connection for each opening.

8. In a lamp of the character specified, a holder for carbid, a reservoir for water, said reservoir being annular in form, and having a central air chamber, said reservoir having a central filling opening, and the upper end of the air chamber being depressed below the said opening, a cup-shaped cover for the filling opening, said cover having openings in the bottom thereof, and seated on the upper end of the air chamber when the cover is closed, a tube extending into the air chamber, a valve normally closing the communication between the tube and the chamber, said tube being longitudinally movable and bearing against the valve to open the same when the tube is moved inward, and a spring normally pressing the tube outward.

JOHN MILTON HIGGINS.

Witnesses:
F. S. PFAHLER,
H. A. RUTTER.

Copies of this patent may be obtained for five cents each, by addressing the "Commissioner of Patents, Washington, D. C."